United States Patent
Tsai et al.

(10) Patent No.: US 9,131,162 B2
(45) Date of Patent: Sep. 8, 2015

(54) IMAGE SYSTEM AND INTERFERENCE REMOVING METHOD THEREOF

(75) Inventors: Chegn Nan Tsai, Hsin-Chu (TW); Ching Lin Chung, Hsin-Chu (TW); Chi Chieh Liao, Hsin-Chu (TW); Chun Yi Lu, Hsin-Chu (TW)

(73) Assignee: PIXART IMAGING INC, Hsin-Chu (TW)

( * ) Notice: Subject to any disclaimer, the term of this patent is extended or adjusted under 35 U.S.C. 154(b) by 71 days.

(21) Appl. No.: 13/329,436

(22) Filed: Dec. 19, 2011

(65) Prior Publication Data

US 2012/0188416 A1 Jul. 26, 2012

(30) Foreign Application Priority Data

Jan. 25, 2011 (TW) .............................. 100102695 A

(51) Int. Cl.
*H04N 9/73* (2006.01)
*H04N 5/238* (2006.01)
*H04N 5/235* (2006.01)
*G06F 3/041* (2006.01)
*G06F 3/042* (2006.01)

(52) U.S. Cl.
CPC ............ *H04N 5/2357* (2013.01); *G06F 3/0418* (2013.01); *G06F 3/0421* (2013.01)

(58) Field of Classification Search
CPC ..................................................... H04N 5/3575
USPC ........... 348/226.1, 227.1, 241, 363, 239, 135; 345/99
See application file for complete search history.

(56) References Cited

U.S. PATENT DOCUMENTS

| | | | |
|---|---|---|---|
| 5,739,804 A * | 4/1998 | Okumura et al. | 345/99 |
| 8,195,579 B2 * | 6/2012 | Kara | 705/408 |
| 2002/0113882 A1 * | 8/2002 | Pollard et al. | 348/239 |
| 2005/0238259 A1 | 10/2005 | Kim et al. | |
| 2008/0211941 A1 * | 9/2008 | Deever et al. | 348/262 |
| 2009/0195671 A1 * | 8/2009 | Han et al. | 348/226.1 |
| 2011/0012866 A1 * | 1/2011 | Keam | 345/175 |
| 2011/0115904 A1 * | 5/2011 | Te-Yuan et al. | 348/135 |
| 2012/0081569 A1 * | 4/2012 | Yost et al. | 348/226.1 |

* cited by examiner

*Primary Examiner* — Roberto Velez
*Assistant Examiner* — Stephen Coleman
(74) *Attorney, Agent, or Firm* — Lowe Hauptman & Ham, LLP

(57) ABSTRACT

There is provided an interference removing method of an image system including the steps of: respectively acquiring different numbers of images within two brightness intervals having different brightness variations using an image sensor having a sampling frequency; lighting a light source with a lighting frequency, which is a half of the sampling frequency, and synchronizing to the sampling frequency; and subtracting a first image, which is associated with the lighting of the light source, acquired in a later brightness interval of two adjacent brightness intervals having identical brightness variations by a second image, which is associated with a sampling time of the first image, acquired in an earlier brightness interval of the two adjacent brightness intervals. The present disclosure further provides an image system.

15 Claims, 3 Drawing Sheets

IMAGE SYSTEM AND INTERFERENCE REMOVING METHOD THEREOF

CROSS REFERENCE TO RELATED APPLICATION

This application claims the priority benefit of Taiwan Patent Application Serial Number 100102695, filed on Jan. 25, 2011, the full disclosure of which is incorporated herein by reference.

BACKGROUND

1. Field of the Disclosure

This disclosure generally relates to an image system and interference removing method thereof and, more particularly, to an image system and the interference removing method thereof capable of eliminating flicker caused by ambient light sources.

2. Description of the Related Art

In present days the image capture technology has been widely applied to various kinds of electronic products, such as the optical touch system, distance measuring system or other optical applications that perform corresponding processes according to acquired images.

Generally speaking, the optical applications mentioned above utilize an image sensor to acquire images and perform post-processing on the acquired images to calculate the variation of image content. However, since the image sensor can only detect the energy variation, the images acquired by the image sensor can be directly influenced when the brightness of ambient light sources changes with time thereby degrading the operation accuracy of the system.

Particularly, when the brightness of the ambient light sources has a complicated variation or the ambient light sources light with different brightness variation cycles, interference caused thereby can not be easily removed so that the operation accuracy of the image system can not be effectively improved.

Accordingly, it is necessary to provide an image system and interference removing method thereof that can eliminate or can at least significantly reduce the flicker problem caused by the ambient light sources mentioned above.

SUMMARY

It is an object of the present disclosure to provide an image system and an interference removing method thereof capable of eliminating flicker on an image system caused by the complicated brightness variation of ambient light sources.

The present disclosure provides an interference removing method of an image system for removing interference of ambient light having a brightness variation cycle each including two brightness intervals having different brightness variations. The interference removing method includes the steps of: respectively acquiring different numbers of images within the two brightness intervals using an image sensor having a sampling frequency; lighting a light source with a lighting frequency, which is a half of the sampling frequency, and synchronizing to the sampling frequency; and subtracting a first image, which is associated with the lighting of the light source, acquired in a later brightness interval of two adjacent brightness intervals having identical brightness variations by a second image, which is associated with a sampling time of the first image, acquired in an earlier brightness interval of the two adjacent brightness intervals.

The present disclosure further provides an image system configured to remove interference of ambient light having a brightness variation cycle each including two brightness intervals having different brightness variations. The image system includes at least one image sensor, a light source and a processing unit. The image sensors respectively acquire different numbers of images within the two brightness intervals with a sampling frequency. The light source lights with a lighting frequency, which is a half of the sampling frequency, and synchronizes to the sampling frequency. The processing unit is for subtracting a first image, which is associated with the lighting of the light source, acquired in a later brightness interval of two adjacent brightness intervals having identical brightness variations by a second image, which is associated with a sampling time of the first image, acquired in an earlier brightness interval of the two adjacent brightness intervals.

In an aspect, the sampling frequency is (2N+1) times of a reciprocal of the brightness variation cycle, and N is a positive integer larger than or equal to 1, wherein the brightness variation cycle may be ($\frac{1}{50}$) second or ($\frac{1}{60}$) second.

In an aspect, the numbers of images acquired within the two brightness intervals having different brightness variations have a difference of 1.

The present disclosure further provides an interference removing method of an image system for removing interference of ambient light having a brightness variation cycle each including two brightness intervals having different brightness variations. The interference removing method includes the steps of: acquiring an odd number of images within each brightness variation cycle using an image sensor having a sampling frequency; lighting a light source with a lighting frequency, which is a half of the sampling frequency, and synchronizing to the sampling frequency; and subtracting a first image, which is associated with the lighting of the light source, acquired in a later brightness interval of two adjacent brightness intervals having identical brightness variations by a second image, which is associated with a sampling time of the first image, acquired in an earlier brightness interval of the two adjacent brightness intervals.

In the image system and interference removing method of the present disclosure, the processing unit may further calculate a displacement according to two successive differences of the first images and the second images. In the present disclosure, since the brightness of ambient light is substantially identical when the first image and the second image are being acquired, interference from the ambient light can be eliminated by calculating a difference of images acquired within two brightness intervals having identical brightness variations.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The present disclosure is related to the elimination of the impact on an image system from ambient light sources illuminate with a brightness variation cycle. Each brightness variation cycle of the ambient light sources outside the image system includes two brightness intervals having different brightness variations, and the different brightness variations of the two brightness intervals may be caused by a single ambient light source or by a combination of different types of ambient light sources.

Figure 1:
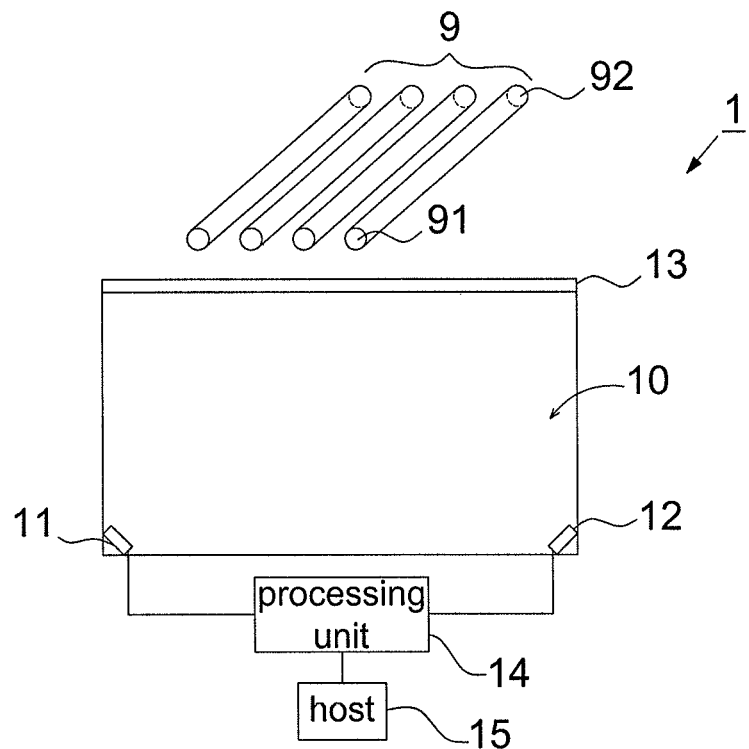
FIG. 1 shows a schematic diagram of an image system according to an embodiment of the present disclosure.
Figure 2:
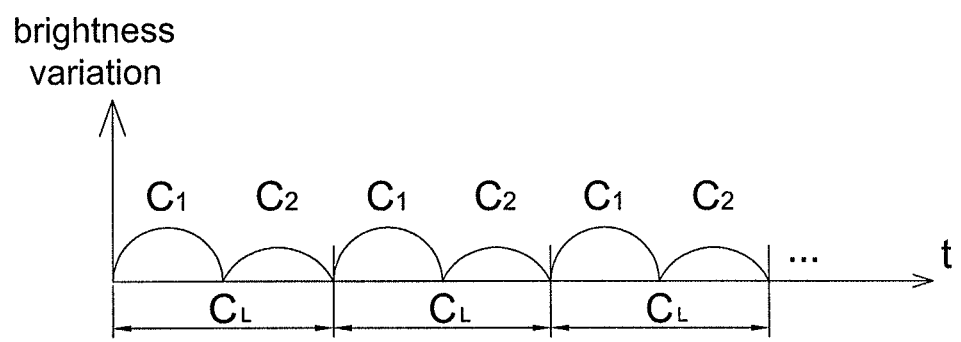
FIG. 2 shows a schematic diagram of the brightness variation of ambient light sources.

Please refer to FIGS. 1 and 2, FIG. 1 shows an image system 1 according to an embodiment of the present disclosure; FIG. 2 shows the brightness variation with time of the ambient light source. Although the image system 1 is shown as an optical touch system herein, in other embodiments the image system 1 may be any system that utilizes at least one image sensor to acquire images to accordingly perform the system control and does not limited to that shown in FIG. 1.

The image system 1 includes a touch surface 10, at least one image sensor (two image sensors 11 and 12 are shown herein), a light source 13 and a processing unit 14. In addition, an ambient light source 9 is also shown in FIG. 1 to represent an operational environment of the image system 1. For example, the ambient light source 9 is shown as a set of fluorescent lamp tubes each having a first end 91 and a second end 92. The brightness variation with time of the two ends (i.e. first end 91 and second end 92) of the fluorescent lamp tubes is shown in FIG. 2. A reason that causes the non-uniform brightness variation of the ends of the fluorescent lamp tubes is the direction of the exciting current. For example, in the half cycle that the AC exciting current flows from the first end 91 to the second end 92, the first end 91 has a higher brightness but the second end 92 has a lower brightness; on the contrary, in the half cycle that the AC exciting current flows from the second end 92 to the first end 91, the first end 91 has a lower brightness but the second end 92 has a higher brightness. Therefore, respective brightness variations of the first end 91 and the second end 92 are different in different half cycles of the brightness variation cycles $C_L$ as shown in FIG. 2. The infrared light emitted by the fluorescent lamp tubes can especially have obvious non-uniform brightness variation due to different directions of the AC exciting current. The ambient light source 9 may illuminate in a brightness variation cycle $C_L$, such as (1/60) Hz or (1/50) Hz, wherein a value of the brightness variation cycle $C_L$ may be determined according to an AC frequency of the power system connected. In FIG. 2, each brightness variation cycle $C_L$ includes a first brightness interval $C_1$ and a second brightness interval $C_2$, wherein the first brightness interval $C_1$ and the second brightness interval $C_2$ have different brightness variations but occupy identical time intervals. It is appreciated that, although an average value of the first brightness interval $C_1$ is larger than that of the second brightness interval $C_2$ as shown in FIG. 2, respective values may be exchanged in other embodiments.

The touch surface 10 may be made of suitable material, and a user may use his or her finger or other touch object to approach or contact the touch surface 10 in order to perform various operations on the image system 1, wherein the operations can be performed may be those in conventional touch systems, such as the cursor control or icon selection, but not limited thereto. Since the operation of a touch system is well known to the art, details thereof will not be repeated herein. The spirit of the present disclosure is to eliminate the negative influence on the operation accuracy of the touch system from the brightness variation of the ambient light source 9 shown in FIG. 2.

The image sensors 11 and 12 may be CCD image sensors, CMOS image sensors or the like. Field of views of the image sensors 11 and 12 preferably involve at least the touch surface 10, and the image sensors 11 and 12 are configured to acquire images looking across the touch surface 10 and containing at least one touch object approaching or contacting the touch surface 10. It should be mentioned that, a number of the image sensors and positions of the image sensors are not limited to those shown in FIG. 1.

The light source 13 is configured to provide the light needed by the image sensors 11 and 12 during acquiring images. In order to realize the interference removing method of the present disclosure (described later), the light source 13 lights once every two images that the image sensors 11 and 12 acquire and turns off in other time periods. In other words, if the image sensors 11 and 12 have a sampling frequency, the light source 13 lights with a lighting frequency, which is a half of the sampling frequency, such that the image sensors 11 and 12 may acquire a first image associated with the lighting of the light source 13 and acquire a second image associated with the turning-off of the light source 13. It should be mentioned that, the light source 13 may be any arbitrary light source such as a light emitting diode (LED), but not limited thereto. In addition, the location and number of the light source 13 is not limited to that shown in FIG. 1, and the light source 13 may be disposed at any suitable location or may have any number as long as the image sensors 11 and 12 are able to acquire images of a touch object blocking the light emitted by the light source 13 and without any particular limitation.

The processing unit 14 receives the images acquired by the image sensors 11 and 12 and performs post-processing. For example, the processing unit 14 calculates a displacement or other operating parameters according to an image variation of the touch object in the images acquired so as to accordingly control the software being executed by a host 15, wherein the method that the processing unit 14 calculates the operating parameters is well known to the art, e.g. calculating the displacement by means of the correlation between images, and thus details thereof will not be repeated herein.

Since the field of views of the image sensors 11 and 12 involve the ambient light source 9, the image of ambient light source 9 may be contained in the images acquired by the image sensors 11 and 12. When the brightness of the ambient light source 9 various as FIG. 2, error-control due to the interference from the ambient light source 9 may happen if the processing unit 14 directly calculates the displacement or control parameters using the images acquired by the image sensors 11 and 12. Therefore, the processing unit 14 can eliminate the impact of the ambient light source 9 on the image system 1 by using the interference removing method of the present disclosure as described hereinafter.

Figure 3:
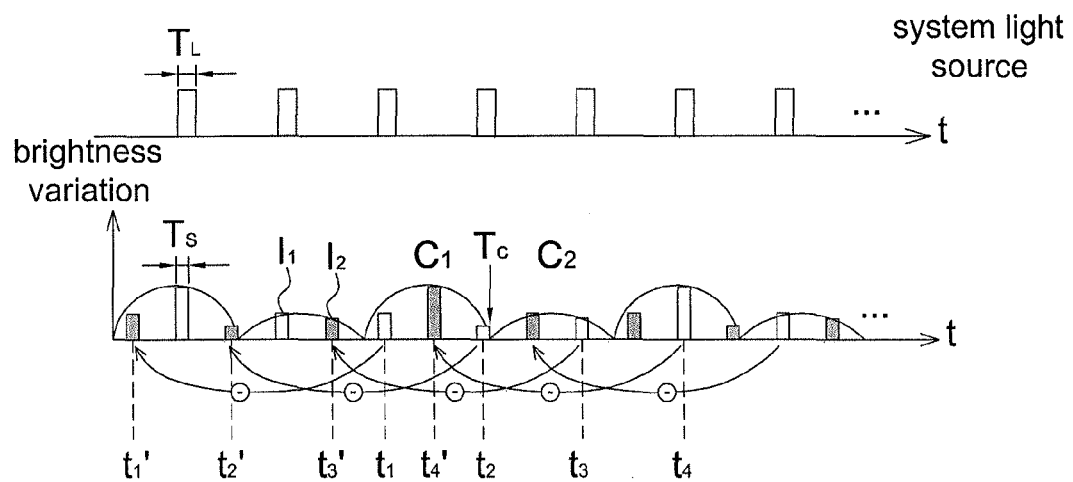
FIG. 3 shows a schematic diagram of the interference removing method according to an embodiment of the present disclosure.

Please refer to FIGS. 1 to 3, FIG. 3 shows a schematic diagram of the interference removing method according to an embodiment of the present disclosure. Under the brightness variation of the ambient light source 9, the image sensors 11 and 12 acquire images with a sampling frequency that is (2N+1) times of a reciprocal of the brightness variation cycle $C_L$, e.g. 60 Hz×(2N+1) or 50 Hz×(2N+1), wherein N is a positive integer larger than or equal to 1, e.g. N=2 in FIG. 3. It should be mentioned that, in order to realize the interference removing method of the present disclosure, the image sensors 11 and 12 acquire different numbers of images respectively within the first brightness interval $C_1$ and the second brightness interval $C_2$, and preferably the numbers of images acquired within the two different brightness intervals have a difference of 1. For example in FIG. 3, the image sensors 11 and 12 acquire three images within the first brightness interval $C_1$ and acquire two images within the second brightness interval $C_2$. In other words, the image sensors 11 and 12 acquire an odd number of images in each brightness variation cycle $C_L$. Since the sampling frequency of the image sensor and the brightness variation cycle $C_L$ are fixed, the image sensors 11 and 12 may acquire images at identical sampling times within the brightness intervals having identical brightness variations. The light source 13 lights once every two images acquired by the image sensors 11 and 12 such that the images sensors 11 and 12 may alternatively acquire a bright image $I_1$ (e.g. hollow rectangles, which are associated with the lighting of the light source 13, shown in FIG. 3) and dark images $I_2$ (solid rectangles, which are associated with the turning-off of the light source 13, shown in FIG. 3). It is appreciated that, a lighting interval $T_L$ of the light source 13 is preferably equal to or a little larger than a sampling interval Ts of the image sensors 11 and 12 such that the light source 13 may provide enough light when the image sensors 11 and 12 are acquiring images.

Next, the processing unit 14 receives and processes the images acquired by the image sensors 11 and 12, e.g. subtracting a first image, which is associated with the lighting of the light source, acquired in a later brightness interval of two adjacent brightness intervals having identical brightness variations by a second image, which is associated with a sampling time of the first image, acquired in an earlier brightness interval of the two adjacent brightness intervals. For example in FIG. 3, in two adjacent first brightness intervals $C_1$, the processing unit 14 subtracts a bright image $I_1$ acquired at a sampling time $t_1$ by a dark image $I_2$ acquired at a sampling time $t_1'$; subtracts a bright image $I_1$ acquired at a sampling time $t_2$ by a dark image $I_2$ acquired at a sampling time $t_2'$; and subtracts a bright image $I_1$ acquired at a sampling time $t_4$ by a dark image $I_2$ acquired at a sampling time $t_4'$; wherein the light source 13 turns on at the sampling times $t_1$, $t_2$ and $t_4$ but turns off at the sampling times $t_1'$, $t_2'$ and $t_4'$. In addition, in two adjacent second brightness intervals $C_2$, the processing unit 14 subtracts a bright image $I_1$ acquired at a sampling time $t_3$ by a dark image $I_2$ acquired at a sampling time $t_3'$; wherein the light source 13 turns on at the sampling time $t_3$ but turns off at the sampling time $t_3'$. The processing unit 14 may obtain an object image after the subtraction, and then calculates a displacement or a control parameter according to an image variation between two object images. It is appreciated that, when the image sensors 11 and 12 acquire images at different sampling times within the brightness variation cycle $C_L$, two images may be acquired within the first brightness interval $C_1$ and three images may be acquired in the second brightness interval $C_2$.

In another embodiment, when an image acquired by the image sensors 11 and 12 is at a connection time Tc of the first brightness interval $C_1$ and the second brightness interval $C_2$, the image may be defined to be acquired within the first brightness interval $C_1$ or within the second brightness interval $C_2$. Therefore, the processing unit 14 may still calculate the displacement or control parameter according to the interference removing method of the present disclosure.

Figure 4:
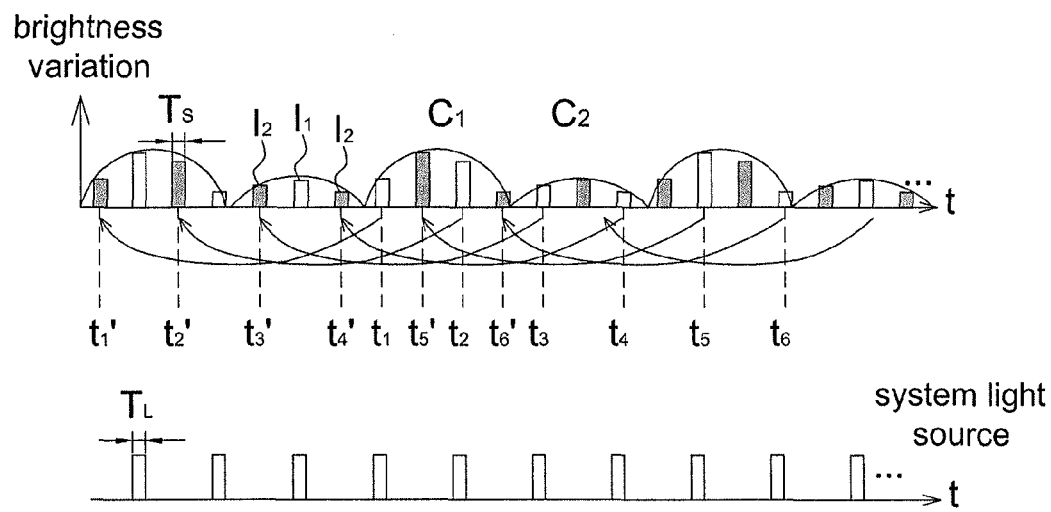
FIG. 4 shows a schematic diagram of the interference removing method according to another embodiment of the present disclosure.

Please refer to FIG. 4, it shows a schematic diagram of the interference removing method according to another embodiment of the present disclosure. Herein the image sensors 11 and 12 acquire images with a higher sampling frequency and the light source 13 also lights with a higher lighting frequency, e.g. N=3 herein. In this embodiment, the image sensors 11 and 12 acquire four images within the first brightness intervals $C_1$ and acquire three images within the second brightness intervals $C_2$. The numbers of images being acquired may be exchanged in another embodiment as long as an odd number of images are acquired in each brightness variation cycle $C_L$. The light source 13 also lights once every two images acquired by the image sensors 11 and 12 such that the image sensors 11 and 12 may alternatively acquire bright images $I_1$ and dark images $I_2$. In two adjacent first brightness intervals $C_1$, the processing unit 14 subtracts a bright image $I_1$ acquired at a sampling time $t_1$ by a dark image $I_2$ acquired at a sampling time $t_1'$; subtracts a bright image $I_1$ acquired at a sampling time $t_2$ by a dark image $I_2$ acquired at a sampling time $t_2'$; subtracts a bright image $I_1$ acquired at a sampling time $t_5$ by a dark image $I_2$ acquired at a sampling time $t_5'$; and subtracts a bright image $I_1$ acquired at a sampling time $t_6$ by a dark image $I_2$ acquired at a sampling time $t_6'$. In addition, in two adjacent second brightness intervals $C_2$, the processing unit 14 subtracts a bright image $I_1$ acquired at a sampling time $t_3$ by a dark image $I_2$ acquired at a sampling time $t_3'$; and subtracts a bright image $I_1$ acquired at a sampling time $t_4$ by a dark image $I_2$ acquired at a sampling time $t_4'$. Similarly, the processing unit 14 may obtain an object image after the subtraction, and then calculates a displacement or a control parameter according an image variation between two object images.

In addition, the image system 1 may further include a storage unit (not shown) for temporarily storing a part of the images acquired in a brightness variation cycle previous to the brightness variation cycle $C_L$ that a current image is acquired by the image sensors 11 and 12. For example, when the image sensors 11 and 12 acquire images at the sampling time $t_1$, the storage unit stores at least the dark images acquired within a brightness variation cycle (including the first brightness interval $C_1$ and the second brightness interval $C_2$) previous to the brightness variation cycle $C_L$ associated with the sampling time $t_1$; e.g. 3 images in FIG. 3 and four images in FIG. 4 are stored in the storage unit. But in other embodiments, the storage unit may store all images acquired within a brightness variation cycle previous to the brightness variation cycle $C_L$ associated with the sampling time $t_1$. The storage unit may be a frame buffer disposed in or outside the processing unit 14.

Figure 5:
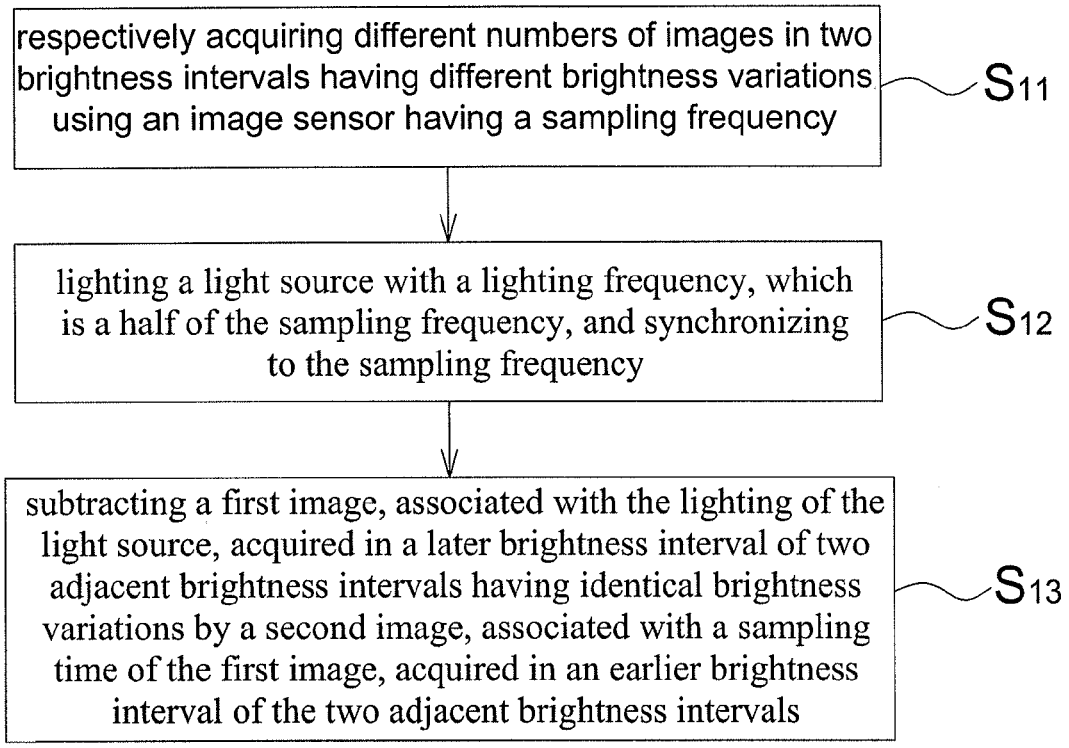
FIG. 5 shows a flow chart of the interference removing method according to an embodiment of the present disclosure.

Please refer to FIG. 5, it shows a flow chart of the interference removing method according to an embodiment of the present disclosure including the steps of: respectively acquiring different numbers of images within two brightness intervals having different brightness variations using an image sensor having a sampling frequency (Step $S_{11}$); lighting a light source with a lighting frequency, which is a half of the sampling frequency, and synchronizing to the sampling frequency (Step $S_{12}$); subtracting a first image, which is associated with the lighting of the light source, acquired in a later brightness interval of two adjacent brightness intervals having identical brightness variations by a second image, which is associated with a sampling time of the first image, acquired in an earlier brightness interval of the two adjacent brightness intervals (Step $S_{13}$). In addition, the interference removing method of the present disclosure further includes the steps of:

outputting an object image according to a difference of the first image and the second image; and calculating a displacement according to two successively outputted object images. Details of the interference removing method of the present disclosure have been described in FIGS. 3 and 4 and associated descriptions, and thus will not be repeated herein.

Figure 6:
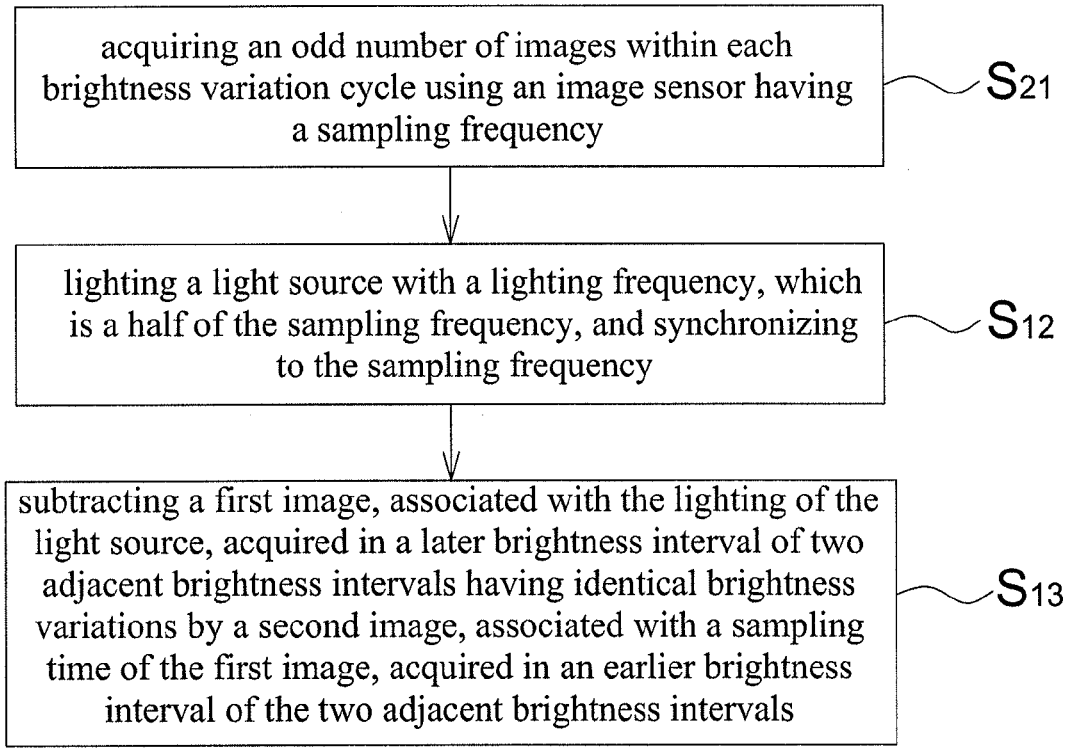
FIG. 6 shows a flow chart of the interference removing method according to another embodiment of the present disclosure.

Please refer to FIG. 6, it shows a flow chart of the interference removing method according to another embodiment of the present disclosure including the steps of: acquiring an odd number of images within each brightness variation cycle using an image sensor having a sampling frequency (Step $S_{21}$); lighting a light source with a lighting frequency, which is a half of the sampling frequency, and synchronizing to the sampling frequency (Step $S_{12}$); and subtracting a first image, which is associated with the lighting of the light source, acquired in a later brightness interval of two adjacent brightness intervals having identical brightness variations by a second image, which is associated with a sampling time of the first image, acquired in an earlier brightness interval of the two adjacent brightness intervals (Step $S_{13}$). Details of the present embodiment are similar to those of FIG. 5, and thus details thereof will not be repeated herein. Compared to the previous embodiment, even an image is acquired at a connection time Tc of the first brightness interval $C_1$ and the second brightness interval $C_2$ by the image sensors 11 and 12 as shown in FIG. 3, the processing unit 14 may still calculate the displacement or control parameter according to the acquired images.

As mentioned above, conventional image systems are not able to totally eliminate the negative influence caused by ambient light sources, especially when the ambient light sources have a complicated brightness variation. Therefore, the present disclosure further provides an image system (FIG. 1) and the interference removing method thereof (FIGS. 3 to 6) that are able to effectively eliminate the negative influence caused by the ambient light sources including two brightness intervals having different brightness variations thereby increasing the operation accuracy of the image system.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An interference removing method of an image system, the image system configured to remove interference of ambient light having a plurality of brightness variation cycles each including a first brightness interval and a second brightness interval, the interference removing method comprising:
   respectively acquiring different first and second numbers of images within the first and second brightness intervals of the ambient light using an image sensor having a sampling frequency, wherein
      each of the images is one image frame acquired by the image sensor, and
      the first brightness interval has a first brightness and the second brightness interval has a second brightness different from the first brightness;
   controlling a system light source to turn on and off in a plurality of lighting cycles at a lighting frequency, which is a half of the sampling frequency and synchronized to the sampling frequency, wherein
      the system light source provides light for the image sensor to acquire the images,
      in each of the lighting cycles, the system light source is turned on once and turned off once,
      the image sensor acquires two images per one lighting cycle,
      the images acquired by the image sensor comprise a first image acquired at a first timing in the first brightness interval of a first brightness variation cycle of the ambient light,
      the images acquired by the image sensor further comprise a second image acquired at a second timing in the first brightness interval of a second brightness variation cycle of the ambient light,
      the second brightness variation cycle is consecutive to the first brightness variation cycle, and
      the first timing in the first brightness variation cycle corresponds to the second timing in the second brightness variation cycle; and
   subtracting the second image from the first image, thereby removing the interference of the ambient light.

2. The interference removing method as claimed in claim 1, wherein the sampling frequency is (2N+1) times of a reciprocal of the brightness variation cycles, and N is a positive integer larger than or equal to 1.

3. The interference removing method as claimed in claim 1, wherein the first number of images differs from the second number of images by 1.

4. The interference removing method as claimed in claim 1, further comprising:
   outputting an object image according to a difference of the first image and the second image; and
   calculating a displacement according to two successively outputted object images.

5. The interference removing method as claimed in claim 1, wherein the system light source is turned off when the second image is being acquired and the system light source is turned on when the first image is being acquired.

6. An image system, configured to remove interference of ambient light having a plurality of brightness variation cycles each including a first brightness interval and a second brightness interval, the image system comprising:
   at least two image sensors respectively acquiring different first and second numbers of images within the first and second brightness intervals of the ambient light with a sampling frequency, wherein
      each of the images is one image frame acquired by the image sensors, and
      the first brightness interval has a first brightness and the second brightness interval has a second brightness different from the first brightness;
   a system light source configured to turn on and off in a plurality of lighting cycles at a lighting frequency, which is a half of the sampling frequency and synchronized to the sampling frequency, wherein
      the system light source is disposed opposite to field of views of the image sensors and configured to provide light for the image sensors to acquire the images,
      in each of the lighting cycles, the system light source is turned on once and turned off once,
      the image sensors acquire two images per one lighting cycle,
      the images acquired by the image sensors comprise a first image acquired at a first timing in the first brightness interval of a first brightness variation cycle of the ambient light,
      the images acquired by the image sensors further comprise a second image acquired at a second timing in the first brightness interval of a second brightness variation cycle of the ambient light, the second brightness variation cycle is consecutive to the first brightness variation cycle, and the first timing in the first brightness variation cycle corresponds to the second timing in the second brightness variation cycle; and a processing unit configured to subtract the second image from the first image, thereby removing the interference of the ambient light.

7. The image system as claimed in claim 6, wherein the sampling frequency is (2N+1) times of a reciprocal of the brightness variation cycles, and N is a positive integer larger than or equal to 1.

8. The image system as claimed in claim 6, wherein the first number of images differs from the second number of images by 1.

9. The image system as claimed in claim 6, wherein the processing unit is further configured to calculate a displacement according to two successive differences of the first image and the second image.

10. The image system as claimed in claim 6, further comprising a storage unit configured to temporarily store a part of the images acquired in an earlier brightness variation cycle previous to a later brightness variation cycle in which a current image is acquired by the image sensors.

11. The image system as claimed in claim 6, wherein the system light source is turned off when the second image is being acquired and the system light source is turned on when the first image is being acquired.

12. The image system as claimed in claim 6, wherein the image system is an optical touch system.

13. The image system as claimed in claim 6, wherein the brightness variation cycles are (1/50) second or (1/60) second.

14. An interference removing method of an image system, the image system configured to remove interference of ambient light having a plurality of brightness variation cycles each including a first brightness interval and a second brightness interval, the interference removing method comprising:

acquiring an odd number of images within each brightness variation cycle of the ambient light using an image sensor having a sampling frequency, wherein each of the images is one image frame acquired by the image sensor, a first number of images are acquired within each first brightness interval and a second number of images are acquired within each second brightness interval, and the first brightness interval has a first brightness and the second brightness interval has a second brightness different from the first brightness;

controlling a system light source to turn on and off in a plurality of lighting cycles at a lighting frequency, which is a half of the sampling frequency and synchronized to the sampling frequency, wherein the system light source is disposed opposite to a field of view of the image sensor and provides light for the image sensor to acquire the images, in each of the lighting cycles, the system light source is turned on once and turned off once, the image sensor acquires two images per one lighting cycle, the images acquired by the image sensor comprise a first image acquired at a first timing in the first brightness interval of a first brightness variation cycle of the ambient light, the images acquired by the image sensor further comprise a second image acquired at a second timing in the first brightness interval of a second brightness variation cycle of the ambient light, the second brightness variation cycle is consecutive to the first brightness variation cycle, and the first timing in the first brightness variation cycle corresponds to the second timing in the second brightness variation cycle; and subtracting the second image from the first image, thereby removing the interference of the ambient light.

15. The interference removing method as claimed in claim 14, wherein when an image is acquired by the image sensor at a connection time of the first brightness interval and the second brightness interval of one brightness variation cycle, the image is defined to be acquired within the first brightness interval or within the second brightness interval.

* * * * *